(12) United States Patent
Thoemmes

(10) Patent No.: US 10,677,132 B2
(45) Date of Patent: Jun. 9, 2020

(54) INJECTOR ASSEMBLY FOR METERING A FLUID INTO AN EXHAUST LINE

(71) Applicant: Robert Bosch GmbH, Stuttgart (DE)

(72) Inventor: Franz Thoemmes, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/773,852

(22) PCT Filed: Sep. 19, 2016

(86) PCT No.: PCT/EP2016/072185
§ 371 (c)(1),
(2) Date: May 4, 2018

(87) PCT Pub. No.: WO2017/076543
PCT Pub. Date: May 11, 2017

(65) Prior Publication Data
US 2018/0320573 A1    Nov. 8, 2018

(30) Foreign Application Priority Data
Nov. 4, 2015   (DE) .................. 10 2015 221 620

(51) Int. Cl.
*F01N 3/20* (2006.01)

(52) U.S. Cl.
CPC .......... *F01N 3/208* (2013.01); *F01N 3/2066* (2013.01); *F01N 2610/02* (2013.01);
(Continued)

(58) Field of Classification Search
CPC .... F01N 3/2066; F01N 3/208; F01N 2610/02; F01N 2610/03; F01N 2610/11; F01N 2610/1453; F01N 2610/146
See application file for complete search history.

(56) References Cited

U.S. PATENT DOCUMENTS

2006/0101810 A1* 5/2006 Angelo ................. F01N 3/0253
                                                                60/286
2007/0033927 A1* 2/2007 Homby ................. F01N 3/0821
                                                                60/286
(Continued)

FOREIGN PATENT DOCUMENTS

CN     103998734 A     8/2014
CN     104662271 A     5/2015
(Continued)

OTHER PUBLICATIONS

International Search Report for Application No. PCT/EP2016/072185 dated Dec. 5, 2016 (English Translation, 3 pages).

*Primary Examiner* — Matthew T Largi
(74) *Attorney, Agent, or Firm* — Michael Best & Friedrich LLP

(57) ABSTRACT

The invention relates to an injector assembly for metering a fluid, in particular a reductant, into an exhaust line (9) of an internal combustion engine, comprising an injector (2), a housing (3) which surrounds the injector (2), a first opening (5) which is provided on the housing (3) in order to allow access for a fluid connection (4) in order to supply the fluid to the injector (2), a second opening (6) which is provided on the housing (3), and an electric connection assembly (7) which is arranged in the housing (3) and which is led from an electric connection (20) of the injector to the second opening (6). The electric connection assembly (7) comprises a line portion (70) and a plug socket (71), and the plug socket (71) is arranged in the housing (3) in a sealed manner on the second opening (6).

13 Claims, 1 Drawing Sheet

(52) U.S. Cl.
CPC ....... *F01N 2610/03* (2013.01); *F01N 2610/11* (2013.01); *F01N 2610/146* (2013.01); *F01N 2610/1453* (2013.01); *Y02T 10/24* (2013.01)

(56) References Cited

U.S. PATENT DOCUMENTS

| | | | |
|---|---|---|---|
| 2007/0228191 A1* | 10/2007 | Harmon | F01N 3/2066 239/533.2 |
| 2008/0265065 A1* | 10/2008 | Lander | F02M 51/061 239/585.4 |
| 2009/0184184 A1* | 7/2009 | Schwegler | F02M 51/0671 239/585.1 |
| 2014/0299202 A1 | 10/2014 | Winkler et al. | |
| 2016/0053650 A1 | 2/2016 | Seitz et al. | |

FOREIGN PATENT DOCUMENTS

| | | | | |
|---|---|---|---|---|
| DE | 102013205309 | | 10/2014 | |
| EP | 2432976 | | 3/2012 | |
| WO | 2013004477 | A1 | 1/2013 | |
| WO | 2014048610 | | 4/2014 | |
| WO | WO-2014048610 | A1 * | 4/2014 | ........... F01N 3/2066 |
| WO | 2014154380 | | 10/2014 | |
| WO | 2015082094 | | 6/2015 | |

\* cited by examiner

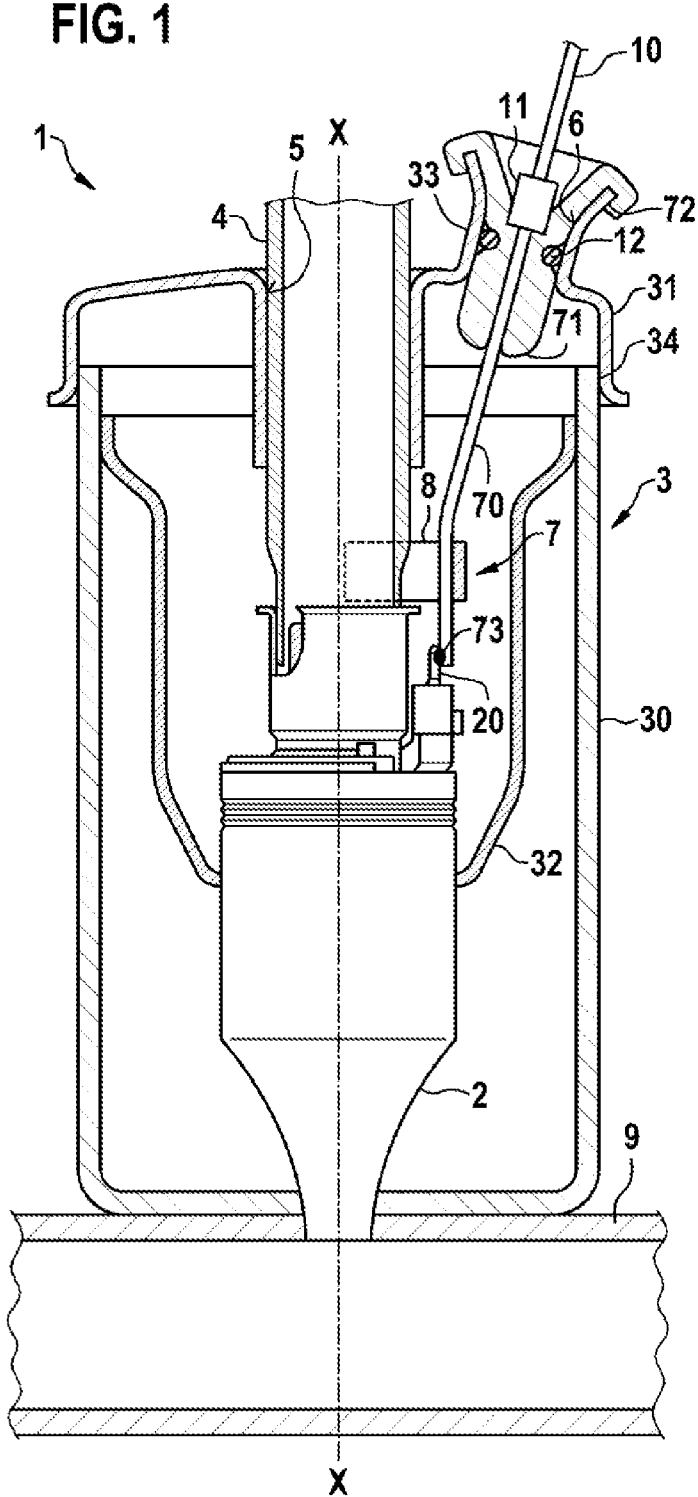

INJECTOR ASSEMBLY FOR METERING A FLUID INTO AN EXHAUST LINE

BACKGROUND OF THE INVENTION

The present invention relates to an injector assembly for metering a fluid, in particular a reductant, into an exhaust line of an internal combustion engine and to an internal combustion engine that has an injector assembly according to the invention.

To reduce exhaust emissions from internal combustion engines, reductants, e.g. urea, are injected into an exhaust line of the internal combustion engine. This is accomplished by means of an injector. Since the temperatures prevailing in the exhaust line are usually very high, urea injectors of this kind have to meet relatively high requirements. An injector of this kind is known from DE 102013205309 A1, for example. To reduce the temperatures of the injector, a cooling circuit is provided here, this cooling circuit being passed around the injector. An electric connection of the injector is passed through the housing, through a grommet made from an elastomer. With urea injectors of this kind, however, there is another problem, which can result from the occurrence of highly reactive vapors, e.g. ammonia, which can arise in the exhaust tract or in the feed line and which attack elastomers and plastics, in particular. Such vapors can significantly reduce the life of the injector assembly.

SUMMARY OF THE INVENTION

In contrast, the injector assembly according to the invention for metering a fluid, in particular a reductant, into an exhaust line of an internal combustion engine has the advantage that high temperatures and highly reactive vapors that may emerge cannot do any damage to the injector assembly. According to the invention, this is achieved by virtue of the fact that the injector assembly has a separate electric terminal assembly, which is arranged in the housing of the injector and which is passed from an electric terminal of the injector to an outlet from the housing of the injector. The electric terminal assembly comprises a line portion and a plug socket, which is arranged in a sealed manner in an opening provided in the housing. Thus, according to the invention, the electric terminal assembly can be optimized in respect of any aggressive vapors which may occur, in particular without plastics and/or elastomers or other materials which could be attacked by the vapors. As a particularly preferred option, the plug socket is made from a metallic material, and an insulation of the line portion in the housing is embodied by a plastic resistant to vapors and water spray. Furthermore, the solution according to the invention also makes it possible to eliminate laborious mounting of a cable tail, which, in the prior art, has hitherto been inserted into the housing and has had to be connected individually to the electric terminals. It is also possible to dispense with a grommet for sealing the cable at the opening in the housing. Electrical connection of the injector can then be achieved simply by inserting a plug into the plug socket. The plug socket is thereby additionally fixed and guided and cannot come loose, even when vibration or shaking movements and high thermal loads occur, for example. Thus, contact between the plug and the plug socket is no longer made in the interior of the housing but at the rim of the housing or outside the housing. As a result, the contacts are not exposed to the reactive vapors which may occur in the housing.

The housing of the injector assembly preferably comprises a main body and a cover. Here, the opening of the electric terminal assembly is preferably provided in the cover. As a further preference, an opening for a fluid connection for feeding the fluid to the injector is also provided in the cover.

As a particular preference, the housing has a sleeve-type neck at the opening of the electric terminal assembly. In particular, the plug socket of the electric terminal assembly is sealed off at the sleeve-type neck by means of an O-ring. This simplifies mounting of the plug socket in the housing since the sleeve-type neck provides guidance for the plug socket. It is furthermore possible to achieve reliable sealing in a simple manner, e.g. by means of an O-ring.

The plug socket is preferably inserted at least partially into the sleeve-type neck of the housing. As a further preference, the plug socket is inserted completely into the sleeve.

As an alternative, a sleeve is preferably arranged in the opening for the electric terminal assembly.

As a further preference, the electric terminal assembly comprises a holding device, e.g. a clip, which fixes the line portion of the electric terminal assembly in the interior of the housing. The line portion is preferably fixed on the fluid connection of the injector assembly. As a particular preference, the holding device is a clip, in particular a clip made from a metallic material. This ensures quick and simple assembly.

For electric insulation, the line portion of the electric terminal assembly is preferably sheathed by means of a resistant plastic. In particular, the plastic is resistant to ammonia.

According to a preferred embodiment of the invention, the plug socket of the electric terminal assembly is connected to the housing by means of a crimped joint. A reliable and, in particular also, fluidtight seal between the plug socket and the housing can thereby be achieved in a simple and low-cost manner. As an alternative, the plug socket is fixed on the housing by means of a clip.

For reliable electrical contacting, the line portion is preferably fixed on the electric terminal of the injector by means of a welded joint.

The present invention furthermore relates to an internal combustion engine comprising an injector assembly according to the invention, which is arranged on an exhaust line of the internal combustion engine. In particular, the injector assembly is an assembly for injecting a reductant, in particular an aqueous urea solution.

BRIEF DESCRIPTION OF THE DRAWINGS

A preferred illustrative embodiment of the invention is described in detail below with reference to the accompanying drawing. In the drawing:

FIG. 1 is a schematic section through an injector assembly according to one illustrative embodiment of the invention, and FIG. 2 is a schematic cross section through part of the injector assembly in FIG. 1.

DETAILED DESCRIPTION

An injector assembly 1 according to a preferred illustrative embodiment of the invention is described in detail below with reference to FIGS. 1 and 2.

As can be seen from FIG. 1, the injector assembly 1 comprises an injector 2, which is arranged in a housing 3. The injector 2 is designed to meter a fluid, in particular a reductant, into an exhaust line 9 of an internal combustion engine. The injector 2 is preferably a urea injector for metering in a mixture of urea and water.

The housing 3 is produced from a metallic material, e.g. stainless steel, and, in this illustrative embodiment, is provided in two parts. In this case, the housing 3 comprises a substantially pot-shaped main body 30 and a cover 31, which closes the pot-shaped main body 30. Also arranged in the housing 3 is an inner housing 32 in order to support the injector 2 and to provide the possibility of guiding a coolant past the injector.

The cover 31 is provided from the same material as the main body 30 and is fixed on the main body 30 by means of a welded joint 34.

A first opening 5 and a second opening 6 are provided in the cover 31. The first opening 5 is used to pass a fluid connection 4 through the cover 31 in order to feed the fluid to be injected to the injector 2. In this case, the fluid connection 4 is aligned in the axial direction X-X of the injector 2 and is connected to the injector by means of a welded connection to the cover, for example.

The injector assembly 1 furthermore comprises an electric terminal assembly 7. The electric terminal assembly 7 is used to connect the injector to a line 10 leading to a control unit (not shown). In this case, the electric terminal assembly 7 is arranged completely in the housing 3. The electric terminal assembly 7 comprises a line portion 70 and a plug socket 71. The free end of the line portion 70 is fixed on an electric terminal 20 of the injector 2 by means of a welded joint 73. In this illustrative embodiment, two line portions 70 (see FIG. 2) are passed to the injector 2.

For stabilization and guidance, the line portions 70 are fastened to the fluid connection 4 by means of a holding device 8 in the form of a plastic clip. This can be seen in detail in FIG. 2.

As can be seen from FIG. 1, the plug socket 71 is arranged partially in a sleeve-shaped neck 33 formed on the cover 31. In this case, the plug socket 71 has a collar, which is bent over and fixed on the sleeve-shaped neck 33 by means of a crimped joint 72. It is thereby possible to achieve simple and reliable fixing of the plug socket 71 on the cover 31. In addition, an O-ring 12 is provided on the outer circumference of the plug socket 71 in order to allow redundant sealing of the interior of the housing relative to the outside of the housing 3.

Thus, according to the invention, the electric terminal assembly 7 can first of all be fixed in a simple and problem-free manner on the injector 2 and, after the mounting of the injector together with the electric terminal assembly 7 in the housing 3 and the fixing of the plug socket 71 on the cover 31, the plug 11 of the line 10 can simply be plugged into the plug socket 71. Since the connection between the line portion 70 and the electric terminal 20 can be made outside the housing 3, automation of the production of the welded joint 73 can be made possible. Furthermore, there is also no need to provide a grommet or the like, as in the prior art, when passing the electric line 10 through the housing. According to the invention, the plug socket 71 is provided at the transition between the housing and the outside of the housing. In the plugged-in state of the plug in the plug socket 71, fixing of the plug socket on the housing 3 is additionally made possible, and therefore it is not possible for the plug socket 71 to come away from the housing, even under a vibration load or a high thermal load.

As an alternative to swaging, it is also possible to use a fastening clip to fix the plug 11.

What is claimed is:

1. An injector assembly for metering a fluid into an exhaust line (9) of an internal combustion engine, the injector assembly comprising
    an injector (2),
    a housing (3), which surrounds the injector (2),
    a first opening (5), which is provided on the housing (3) in order to allow access for a fluid connection (4) for supplying the fluid to the injector (2),
    a second opening (6), which is provided on the housing (3), and
    an electric terminal assembly (7), which is arranged in the housing (3) and which passes from an electric terminal (20) of the injector to the second opening (6),
    wherein the electric terminal assembly (7) comprises a line portion (70) and a plug socket (71),
    wherein the plug socket (71) is arranged in the housing (3) in a sealed manner on the second opening (6), and
    a holding device (8), which fixes the line portion (70) in the interior of the housing, wherein for stabilization and guidance, the line portion (70) is fastened directly to the fluid connection (4) via the holding device (8), wherein the holding device (8) is a plastic clip.

2. The assembly as claimed in claim 1, characterized in that the housing (3) comprises a main body (30) and a cover (31).

3. The assembly as claimed in claim 2, characterized in that the second opening (6) is provided in the cover (31) of the housing (3).

4. The assembly as claimed in claim 1, characterized in that the housing (3) has a sleeve-type neck (33) at the second opening (6).

5. The assembly as claimed in claim 4, characterized in that the plug socket (71) is inserted at least partially into the sleeve-type neck (33).

6. The assembly as claimed in claim 1, characterized in that a sleeve is provided on the second opening (6), and the plug socket (71) is arranged completely in the sleeve.

7. The assembly as claimed in claim 1, characterized in that the line portion (70) is insulated by means of a resistant plastic or is insulated by means of an insulating sleeve.

8. The assembly as claimed in claim 1, characterized in that the plug socket (71) is connected to the housing (3) by a crimped joint (72).

9. An internal combustion engine comprising the injector assembly (1) as claimed in claim 1, which is arranged on an exhaust line (9) of the internal combustion engine.

10. The assembly as claimed in claim 1, wherein the plastic clip is a U-shaped plastic clip.

11. The assembly as claimed in claim 1, wherein a gap is disposed between the line portion (70) and the fluid connection (4) at a location where the plastic clip is coupled to the line portion (70).

12. The assembly as claimed in claim 1, wherein the plastic clip is a separate element from both the line portion (70) and the fluid connection (4).

13. The assembly as claimed in claim 1, wherein the line portion (70) is a first line portion, wherein the assembly includes a second line portion (70), and both the first line portion (70) and the second line portion (70) are fastened to the fluid connection (4) via the plastic clip.

* * * * *